W. KAUFMANN.
TIRE BUILDING MACHINE.
APPLICATION FILED JULY 6, 1915.

1,179,528.

Patented Apr. 18, 1916.
2 SHEETS—SHEET 1.

WITNESS:
S. G. Taylor

INVENTOR
Wilhelm Kaufmann,
BY
Ernest Hopkinson
HIS ATTORNEY

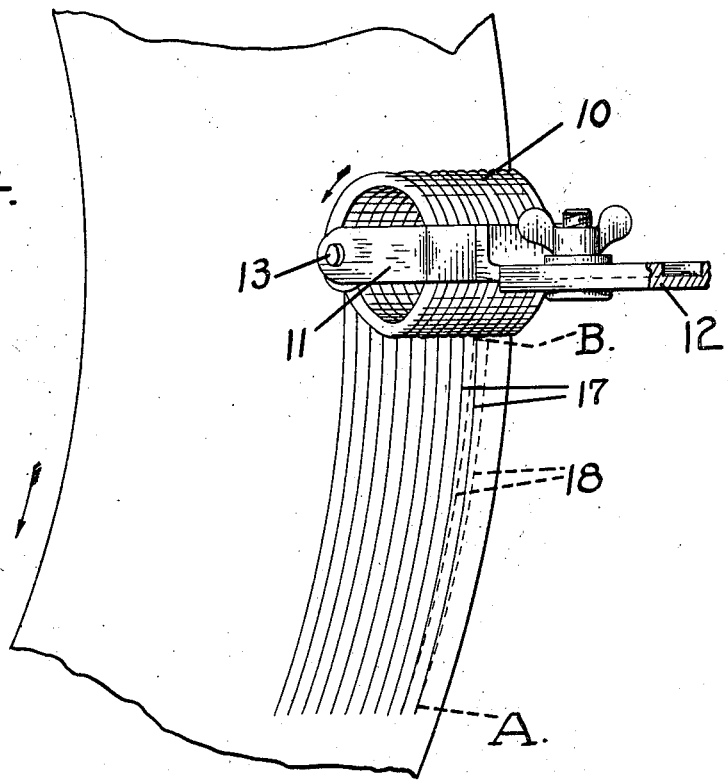
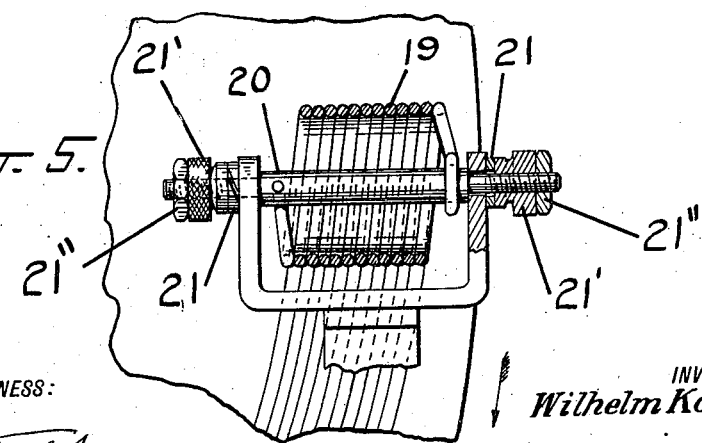

UNITED STATES PATENT OFFICE.

WILHELM KAUFMANN, OF NEW YORK, N. Y., ASSIGNOR TO THE HARTFORD RUBBER WORKS CO., A CORPORATION OF CONNECTICUT.

TIRE-BUILDING MACHINE.

1,179,528.  Specification of Letters Patent.  Patented Apr. 18, 1916.

Application filed July 6, 1915. Serial No. 38,107.

*To all whom it may concern:*

Be it known that I, WILHELM KAUFMANN, a citizen of the United States, residing in the city, county, and State of New York, have invented certain new and useful Improvements in Tire-Building Machines, of which the following is a full, clear, and exact description.

This invention relates to tire building machines, and has for an object to provide a novel tool for smoothing and shaping the tire to the configuration of the tire forming core.

In the manufacture of tires it is customary to employ a revoluble ring core upon which the tire is built from successive layers of fabric pressed to conform intimately to the configuration of the core. The present invention provides a tool adapted to operate upon the surface of a tire under construction and smooth out inequalities and press the layers into intimate association with each other, the tool having a novel yielding working surface, so that flexibility of operation in adapting the tool to the needs of the tire will be assured.

With the above objects in view the invention consists in certain novel details of construction and combinations of parts hereinafter fully described and claimed, it being understood that various modifications may be resorted to within the scope of the appended claims without sacrificing any of the advantages or departing from the spirit of the invention.

Figure 1:
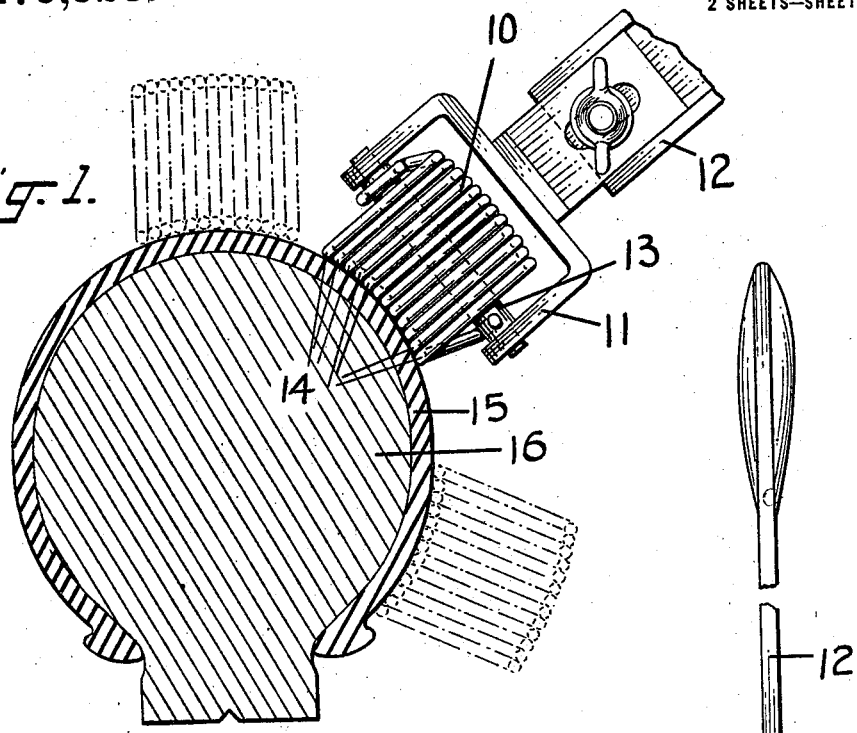
Figure 2:
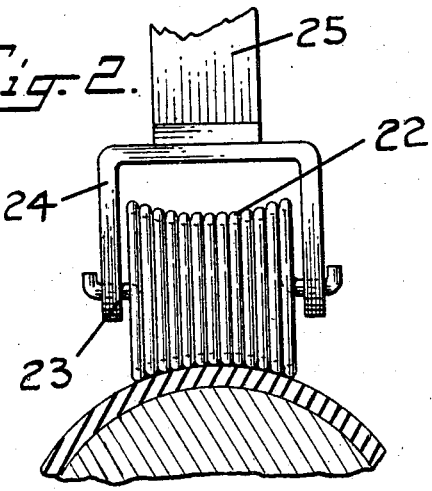
Figure 3:
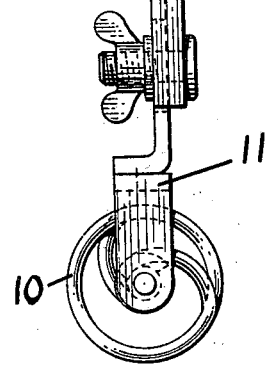

In the accompanying drawings, forming part of this specification—Figure 1 is a fragmentary view in elevation showing the tool in operative position; Fig. 2 is a view in elevation showing a modified form of the invention; Fig. 3 is a side elevation of the tool shown in Fig. 1; Fig. 4 is a fragmentary view in elevation showing the curves generated by the tool during one revolution; Fig. 5 is a sectional view of another modification of the tool.

In carrying out the invention, I provide a smoothing and compacting tool for the tire, comprising preferably a helical spring 10 which is mounted to turn freely on its axis in the fork 11 of a support 12. The spring in this embodiment is mounted upon a shaft 13, the ends of which are journaled in the fork 11. The surface of the helical spring presents simultaneously a plurality of points 14 in contact with the surface of the tire 15 under construction upon a ring core 16, said points all operating with substantially equal pressure. The convolutions of the spring yield independently of each other and permit of the spring conforming automatically to the various contours of the tire surface at any particular location of the tool upon the tire. These two characteristics, *i. e.*, equal pressure throughout all points of contact, and automatic conformation to variations in the tire surface, coact in effectively smoothing out inequalities and intimately attaching the various tire materials throughout at all points without the harsh crushing effect on the fabric of the edge of the usual disk used for this purpose. During each revolution of the spring, which is frictionally driven by contact with the revolving tire, the various spiral convolutions press respective curves 17 on the surface of the tire, thereby intimately attaching the various layers at points coincident with said curves. The curves being generated by spirals rolling upon the annular surface of the tire, are not concentric with the circumference of the tire, as are the curves 18 generated by disks, but each curve deviates continually from the concentric as shown at A—B, as the curve progresses. Therefore, during a single revolution of the spring each curve as at A—B passes diagonally across a zone equal in width to the pitch of the spring. The fabric is thus rolled down at points which would not be operated upon at all by a disk or disks manipulated to roll circumferences 17 corresponding to the pitch of the spring.

The tool may be moved radially in a direction from the crown portion to the edge or bead portion of the tire, as shown by the dotted line and full line positions in Fig. 1, whereby the spring will generate overlapping annular zones, which continually decrease in diameter. Thus every point on the tire surface will be operated upon. This bodily movement of the tool may have an effect of stretching the fabric radially toward the beads, but to assure of a positive stretch being given to the fabric, even independent of said bodily movement of the tool, I contemplate the modification shown in Fig. 5. In said Fig. 5 I have shown a right-handed spring 19 which is frictionally retarded against free rotation on its shaft 20 by spring washers 21. The spiral convolutions of the spring in this modification act as the spiral thread of a screw and exert a thrust upon and stretch the fabric in a direction radially toward the edges or beads of the tire, much in the same manner that a screw exerts a thrust to back off its nut when both are axially rotated in the same direction with the nut turning faster than the screw. The brake effect of the spring washers may be graduated as desired by manipulating the adjusting nuts 21' and set nuts 21" in the usual manner.

In Fig. 2 I have shown a modification of the invention in which the helical spring 22 is formed smaller at the center than at the ends, and has outturned ends 23 which are journaled in the fork 24 of a support 25 and serve in themselves as a shaft for the spring. Various other modifications in shape, size, and form, may be resorted to, but will not be described herein, it being simply necessary to the practice of my invention, that a tool be provided with a yielding working surface having spirally disposed working points for contact with a tire.

What is claimed is:

1. A tire builder's tool, embodying a support, and a rotatable member thereon having spirally disposed working points for contact with a tire.

2. A tire builder's tool, embodying a support, and a rotatable member thereon having yielding spirally disposed working points for contact with a tire.

3. A tire builder's tool, embodying a support, and a member having a plurality of yielding spiral convolutions for contact with the tire.

4. A tire builder's tool, embodying a support, and a member rotatably mounted thereon and having a plurality of spirally disposed working points for contact with the tire.

5. A tire builder's tool, embodying a support, and a helical spring mounted thereon to yieldably engage a tire, and simultaneously present a plurality of working points thereto.

6. A tire builder's tool, embodying a support, and a helical spring rotatably mounted axially on said support for contact with a tire.

7. A tire builder's tool embodying a support, a helical spring axially mounted for rotation on said support, and means for restricting free rotation of said spring.

Signed at New York, N. Y., July 1, 1915.

WILHELM KAUFMANN.